United States Patent Office 3,341,182
Patented Sept. 12, 1967

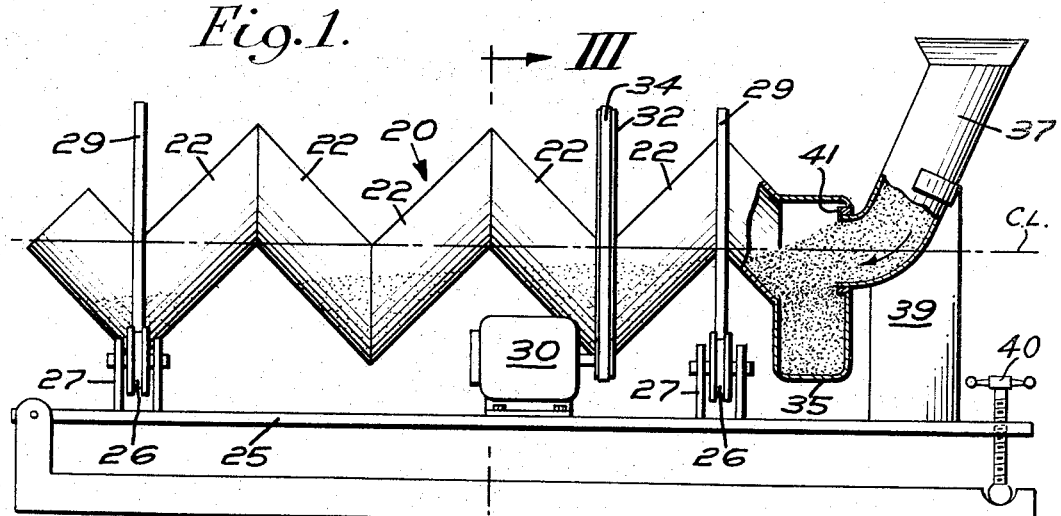
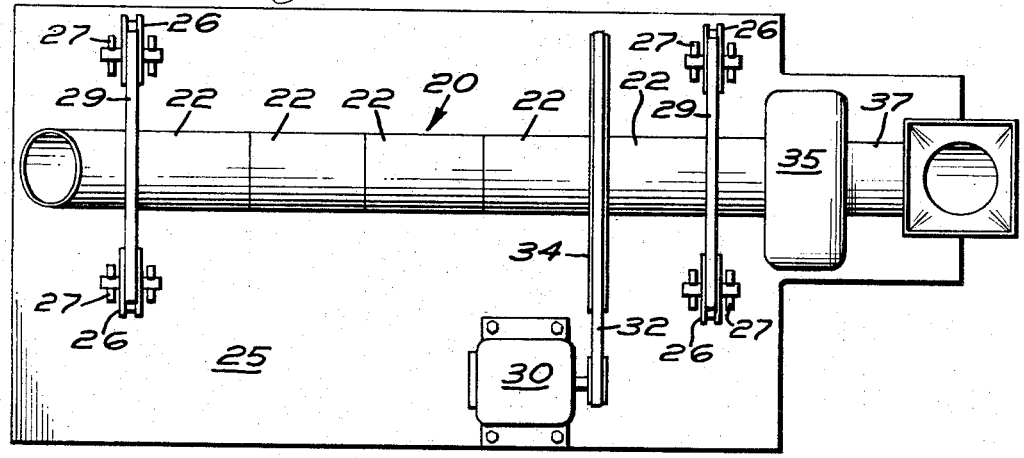
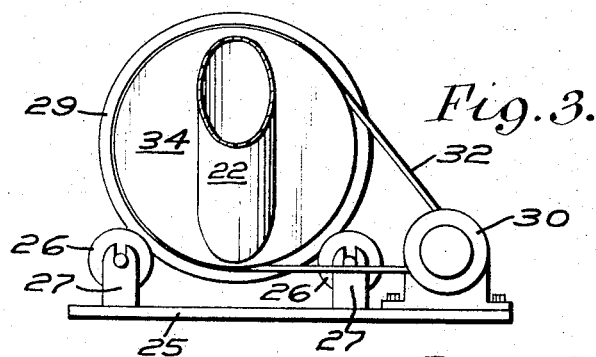
INVENTOR.
JOHN J. FISCHER
BY:
Beau, Brooks, Buckley & Beau,
ATTORNEYS.

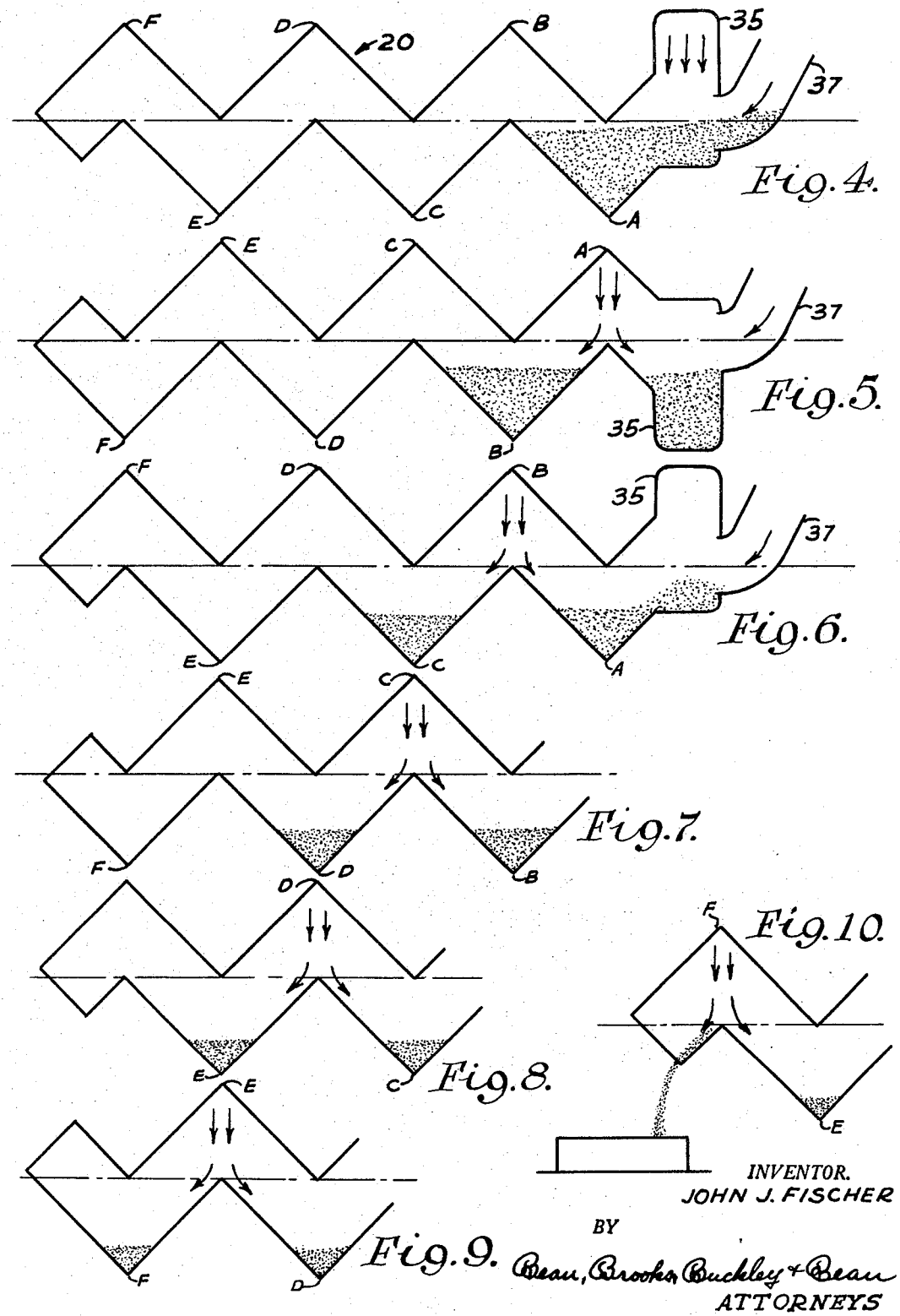

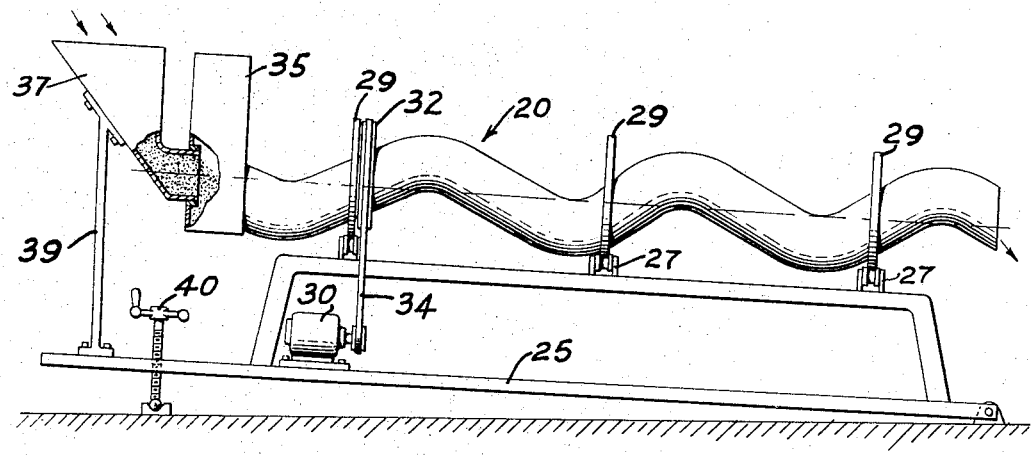

3,341,182
MATERIALS FEEDING AND BLENDING
John J. Fischer, East Stroudsburg, Pa., assignor to The Patterson-Kelley Co., Inc., East Stroudsburg, Pa.
Filed Apr. 10, 1962, Ser. No. 186,469
10 Claims. (Cl. 259—3)

This invention relates to the material handling industry, and more particularly to loose material feeders and/or mixing or blending devices. More specifically, the invention relates to such apparatus of the continuously rotating or "tumbling" type. As shown herein, the machine of the invention draws upon a continuous feed supply while discharging accurately measured batches of product. As an incident thereto, if the machine feed comprises two or more different kinds of materials they will become mixed into the form of a uniformly blended product.

Thus, a primary object of the present invention is to provide an improved materials handling machine adapted to function as a metering feeder to which materials may be continuously added and from which a homogeneous product will be discharged, intermittently, in precisely metered batch form.

Another object of the invention is to provide an improved machine as aforesaid which will deliver precisely metered "batch" loads of blended products from mixtures of feed materials incidental to a continuously running blending operation.

A further object of the invention is to provide a device as aforesaid which is simple and rugged in design and which involves a minimum of moving parts.

Other objects and advantages of the invention will appear from the description hereinbelow and the accompanying drawing wherein:

FIG. 1 is a side elevational view of a machine of the invention;

FIG. 2 is a top plan view of the device of FIG. 1;

FIG. 3 is a sectional view taken on line III—III of FIG. 1;

FIGS. 4–10 are schematic views showing the progress of a batch of material through the machine; and FIG. 11 is a view corresponding to FIG. 1 but of a modified form of the machine.

The device of the invention is the result of extended research and development work on the basic V-type blending mill which is the subject of my previous Patent No. 2,514,126. Generally stated, by modifying the V-type blender aforesaid and providing in effect a series of intercommunicating V-sections, and means for feeding material to one end of the series while permitting it to dump in batches from the other end, a very efficient and useful metering and blending device having unique and desirable characteristics has been developed.

Referring now to FIGS. 1, 2 and 3 herewith, the blending device of the invention will be seen to comprise generally a blending or mixing container 20 made of metal, plastic or other suitable material, and which is formed to provide a series of intercommunicating truncated tubular sections 22, which are disposed in zig-zag relation in one plane (FIG. 1) and in straight-line relation in a plane normal to the first-mentioned plane (FIG. 2). Thus, the configuration of the container 20 presents in one view a series of intercommunicating V-shaped members.

The container 20 is preferably mounted for rotation on a tilt table base member such as is indicated at 25; which may be provided in the form of a plate of metal, wood or any other suitable material. Flanged trunnion wheels as shown at 26 are carried on the base 25 as by mounting brackets 27, to engage corresponding trunnion rims such as are indicated at 29, 29 to support the container for rotation. The rims 29, 29 are mounted so that their centers of rotation coincide with the longitudinal center line of the container as indicated at C.L. (FIG. 1) to minimize eccentric loadings on the mounting mechanism. Any suitable means for rotating the container assembly may be provided, such as a motor 30 driving through a chain 32 trained around a sprocket 34 which in turn is mounted on the container 20 concentrically with the rims 29, 29.

A means for feeding the container 20 while it is rotating is shown as comprising a material receiving drum 35, which is fixed to the end of the container 20 eccentrically of its center line of rotation. The drum 35 is formed with a circular feed receiving opening through the end wall thereof, concentric with the axis of rotation of the container. A loading chute 37 is mounted in fixed position upon the base 25 such as by means of a supporting stand 39, and has its discharge end in communication with the feed inlet opening in the end wall of the drum 35. As shown, the end of the chute may extend somewhat into the drum and a gasket 41 may be employed to seal the juncture of the chute 37 and the drum 35 to prevent leakage of material therefrom.

Efficient dry particle blending depends upon random motions of individual particles relative to one another. Gravity is an ideal mechanism for imparting such mobility to the material because it acts upon all particles simultaneously. Any factor that inhibits uniform particle mobility will of course tend to degrade blend uniformity. For example, different particle size, or density, or flow properties introduce such factors. Tendencies of some kinds of particles to attract or repel other particles can create difficult problems, and the electrostatic charge phenomena often contributes to the problem. Avoiding excessive mechanical working of the particles offers the best technique for combatting such tendencies.

The machine of the invention tumbles dry particles in the same manner as the blender disclosed in my earlier Patent No. 2,514,126. But in addition it also moves the particles both downstream and upstream. The net flow is downstream, and thus a situation of flow equilibrium is established. Hence, at each leg of the machine, back-and-forth flow conditions are stabilized. Most of the theory describing flow conditions, recycling and mean residence time grows out of these fundamentals. Flow rate in a given machine depends on rotation speed and on the angle of tilt at which the rotation axis is set. The tilt angle is adjustable so that for an optimum r.p.m., output can be regulated within desired limits.

Traverse of material through the machine depends on conditions at the feeder and on an equilibrium that establishes itself at each leg downstream. The feed chamber completely fills the first blender leg once each revolution; when that leg is pointed downward. It raises and lowers its charge once each revolution. When it is raising the charge, the adjacent first blender leg is descending and material then flows into that leg. It stops when flow is blocked by filling of the first blender leg. When the feeder is lowering its charge, part but not all of the material that went into the first blender leg rolls back again. Therefore, the feed drum has some space to accept more material in its inlet from the feed hopper. This new material enters, then flow into the feed chamber is blocked by filling of the inlet aperture.

This establishes an equilibrium flow situation, and it is apparent that the difference between flow into the first leg and flow back out of it each revolution, must be equal to flow out of the last downstream leg each revolution. The discharge leg (the last downstream section of the machine) dumps its charge each revolution. It is actually the only leg that handles a unidirectional flow. Every upstream leg has a downstream flow for a half revolution followed by an upstream flow during the other half revolution. The differences between upstream and downstream flows in all legs are equal, and all these differences, under equilibrium conditions, equal the periodic discharge that occurs at the last leg each revolution.

Flows and charges in the series of legs are all different, even though the flow differences are equal. The first leg is filled each revolution, and the last leg is emptied each revolution. Thus, these blender legs carry progressively smaller charges as material migrates downstream. Recycling of material occurs at each V-junction during each revolution. A certain portion of the material held by that part of the blender goes upstream, and the rest goes downstream. Whether any individual particle falls into one-half or other is a matter of random chance.

The mean residence time can be determined empirically for a given situation by comparing the discharge slug quantity with total material in the blender:

Residence time (or blending time) =

$$\frac{\text{Material holdup}}{\text{Thru-put (min.)}} = \text{Blending time (min.)}$$

Feeder variations can be compensated for by recycling, and this is the most practical reason for concern with recycling. Thus, for example, a 3-component blend may be required to have proportions of: 60% of "A"; 30% of "B"; and 10% of "C." Presently available solids feeders can only provide an average of these percentages over substantial periods of time. At any instant, considerable plus or minus variations must be expected. Only multiple recycling can provide the means for dumping back a minus flow rate to a plus flow rate, or vice versa, to effectively level off the varying input flow rate. Therefore random particle recycling as provided by the machine of the invention smooths out errors in proportions of constituents introduced at the blender feed hopper, and the blend at the discharge end will be as uniform as the average performance of the feeding equipment rather than a function of the instantaneous variation.

Otherwise stated, when the container is rotated the basic mixing effect on material within each section of the container will be similar to the action of the blending device as disclosed in my previously mentioned patent. Hence, as the container rotates so as to bring an apex portion thereof to an elevated position, the loose material within that apex portion is tumbled over and falls downwardly against the crotch or ridge portion therebelow which is defined by the juncture of adjacent cylinder legs. This ridge portion then operates to split the downwardly rolling load into two parts, and to divert them to flow in obliquely lateral and downward paths toward the adjacent apex portions at opposite sides thereof.

Thus, portions of the load moving toward an apex portion of the unit simultaneously from opposite leg portions thereof will drive into and through each other so as to thereby effect superior blending operations. The overall operation of the device may be described as alternate mixing of the load materials into one batch and then splitting of the mixture into two batches which subsequently remix with portions of the load coming from the next adjacent tubular sections of the container as a result of the convergent impingement actions of the rolling streams of load materials. Furthermore, incidental to operation of the device as above described, as viewed endwise of the mill the load materials are given both vertical and lateral rolling motions as well as tumbling or overturning and following movements of elevated portions of the load relative to portions of the load still remaining at lower elevations. The above described lateral displacements and alternate load splitting and remixing actions are obtained in combination with constant tumbling and folding and rolling actions of the load in response to rotation of the unit.

As a blender the machine disclosed herein is more efficient than a container of simple V-shape form because the material in any but the first or last leg section of the container will be subject to two splitting and two re-combining cycles in each complete revolution of the container. However, of even more importance is the fact that the blender configuration described herein and shown in the drawings herewith provides two other outstanding operating characteristics which provide unique advantages in mixing or blending operations. Firstly, rotation of the blending apparatus of the invention automatically effects a feeding or traveling movement of material therewithin along the length of the container. The travel effect referred to would normally be from the center of the container outwardly toward both ends thereof, but by virtue of the arrangement of the receiving drum 35 and loading chute 37 as illustrated egress of material from the intake end of the container is prevented. Thus the feed-in effect results in an overall travel of material from the intake end of the container toward the discharge end thereof.

For example, FIGS. 4 through 9 illustrate the travel or feed effect as it operates on a single increment or batch of material introduced through the load chute 37. Starting with a position as shown in FIG. 1, it will be seen that due to the eccentric mounting of the drum 35, the latter will become substantially filled when the drum is in its lowermost position. Then, as the machine rotates 180 degrees so as to dispose the drum in its uppermost position (FIG. 4) the material within the drum is spread out so as to substantially fill the apex portion A of the machine. Then, upon further rotation of the machine through another 180 degrees the batch is split into two separate parts (FIG. 5) occupying the lower portion of the drum 35 and apex portion B of the machine. When the machine rotates again through still another 180 degrees the batch previously occupying the apex portion B is now split between apex portions A and C (FIG. 6), while the portion of the batch previously occupying drum 35 is now split between the drum 35 and the apex portion A. Thus, as the machine rotates through each successive 180-degree phase of rotation the batches occupying bottom apex portions of the machine are further subdivided and transported progressively through the consecutively intercommunicating and zig-zag disposed tubular portions of the machine (FIGS. 7–9), until finally a subdivided portion of the initial batch is dumped from the discharge end of the machine (FIG. 10) incidental to each revolution. Throughout the above described process the material is constantly rolled, dumped, and infolded, and split and remixed incidental to each revolution of an apex portion of the machine to its uppermost position. Obviously, if the feed to the machine through the chute 37 is maintained continuously, a fresh supply of feed material will constantly intermix with the reversely thrown portion of each batch as depicted in FIG. 5.

Thus, progress of the material through the machine is accompanied by a superior material blending action, and it will also be noted that each 360-degree revolution of the machine will cause a precisely subdivided portion of the load to be discharged therefrom in batch form. By altering the inclination of the center line of the machine (such as adjusting the screw 40 (FIG. 1) to raise or lower one end of the machine bed 25, the size of each batch of material to be discharged from the machine may be precisely regulated. Furthermore, by simple regulation of the speed of rotation, the number of batches discharged per minute may be precisely controlled; and thus it will be appreciated that the machine of the invention comprises a readily regulated and precisely operable material flow metering device.

Hence, the machine is particularly adapted for example to be employed in conjunction with package filling operations wherein rows of empty containers are transported adjacent the discharge end of the machine in synchronization with the machine rotation, so that precisely measured batches of material may be dumped into each container. Or, the machine may be employed simply to blend materials from plural supply sources and to deliver a uniformly mixed product to a conveyor or the like at any desired rate of delivery. In any case, the machine is "self-feeding" in the sense that it may be adjusted to deliver at the desired rate and it will automatically draw upon the feed supplies through the chute 37 in accord with the feeding requirements.

It is a particular feature of the machine of the invention that it is adapted to deliver a precisely measured mix of different materials whereas prior art arrangements involving the use of pluralities of feeders handling different materials have been subject to substantial variations in the qualities or proportions of the output. In the case of the present invention each fall of material from an apex portion of the machine as it rotates toward its uppermost position results in a recycling of more than one-half of the batch previously occupying the apex. The quantity recycled can be regulated by simply adjusting the tilt of the container. Therefore, any inequalities of feed ratios in the load material are being constantly leveled out; and the method for accomplishing this in the case of the present invention is much simpler than in the case of any other recycling method.

It will, of course, be appreciated that the machine will provide the superior blending features referred to hereinabove when working with solids of various degrees of fineness, specific gravity, etc., and will also be similarly effective when both liquid and solid materials are to be blended and delivered by the machine.

Many advantages accrue to the machine of the invention because it is basically of the tumbler type. It employs no internal scrapers, stirring devices, screens, vanes or paddles. Thus, gentle action is an inherent characteristic of its operation. Solid particle mobility is produced entirely by gravity forces, and the motions are rolling ones. Consequently, particles are not crushed, smeared, or otherwise subjected to excessive mechanical work. Self-feeding from the input hopper is automatic, and the unit accepts material at a pre-set rate which can be adjusted and controlled as explained hereinabove while metered slugs of blended material are discharged intermittently at the output end of the machine. The slugs of output material are uniformly aerated and are therefor of constant bulk density. The slugs are measured out with extremely high precision; the maximum variation from slug to slug being usually less than one percent. As hereinabove explained, control of the volume per slug is easily regulated and hence the quantity of material discharged per slug can be set within close limits.

From the blending viewpoint recycling of the feed material goes on continuously during operation of the machine. Backward and forward traverses of the material occur at random. This is an especially important feature for applications where feed rates of different constituents may vary. Therefore even when input feed proportions are markedly non-uniform on a short-time basis, the machine delivers uniform mixtures.

Simplicity and construction and easy cleanability are inherent in the machine design. The unit employs the simplest of internal shapes having only smooth surfaces. Also, all interior surfaces and parts are readily accessible. From the standpoint of maintenance, there are no screens, baffles, flights or impellers that need to be removed and/or replaced. Metal surface areas exposed to the charge are at a minimum consistent with the job that has to be accomplished. Shell wear is negligible because the internal action employs only a characteristically gentle rolling motion. There is a minimum of scraping, and no tendency to jam or compact the charge, as is the case of pusher or screw type mixers. For example, grinding wheel abrasives may be blended in machines of the present invention which are fabricated of ordinary carbon steel, with negligible equipment wear and long service life.

It should be noted that in FIGS. 1–3 herewith I have disclosed only one presently preferred form of the machine of the invention, wherein consecutively communicating legs of the container are of truncated cylindrical form and disposed in 90 degree angular relation, and in a common plane. However, various modifications thereof may be employed. For example, the angular relation between adjacent legs may be at any other preferred angle than as shown in FIG. 1, and instead of the sharp apex configuration the container may be fabricated to a more smoothly undulating form as shown in FIG. 11. Also, instead of forming all of the leg portions in a common plane so as to provide the straight line form as seen in FIG. 2, the legs may also be angularly related in lateral directions so as to extend in various radial directions as viewed in FIG. 3. As shown in FIG. 1 the container may be readily fabricated of steel tubing pieces cut off angularly and welded together to provide the zig-zag form thereof. Or, in lieu thereof, the container may be fabricated by using short lengths of threaded pipe and appropriate threaded elbows to interconnect adjacent leg portions. Or, as shown in FIG. 11, the container may be fabricated by simply casting, or by bending a piece of straight tubing into the desired undulent form. Also, it will be appreciated that the container may or may not be jacketed for heating or cooling purposes.

Thus, although only a few forms have ben illustrated and described in detail hereinabove, it will be understood that various changes may be made therein without departing from the spirit of the invention or the scope of the following claims.

I claim:

1. A materials handling machine comprising a single container of generally tubular form through which material is to be transported from a feed supply to a point of discharge, said container being of zig-zag overall configuration in one plane while being of straight line form in a plane at right angles thereto, said container terminating at one end thereof in a discharge spout portion, said container including an eccentrically mounted feed inlet drum at the other end of said machine, gravity feed means disposed to feed material into said drum, means for rotating said container about its longitudinal axis, and means for adjusting the inclination of said longitudinal axis relative to the base support of said machine.

2. A materials handling machine comprising a single tubular container of undulent form adapted to transport material from a continuous feed supply to a point of batch discharge, said container being disposed with its general longitudinal axis extending substantially horizontally, means mounting said container for rotation about said axis, means for driving said container to rotate about said longitudinal axis, and means for adjusting the inclination of said longitudinal axis relative to the horizontal.

3. A materials handling machine comprising a single tubular container of undulant form, said container terminating at one end in a discharge portion, said container including an eccentrically mounted feed inlet drum at the other end of said machine, gravity feed means disposed to feed material into said drum, and means for rotating said container about its longitudinal axis.

4. A materials handling machine comprising a single container of generally tubular form but undulant-shaped in side view and having its general longitudinal axis disposed substantially horizontally, said container being formed at one end thereof with a discharge opening, said container including a feed inlet drum at the other end of said machine, feed means disposed to feed material into said drum, means for rotating said container about its general longitudinal axis, and means for adjusting the inclination of said longitudinal axis relative to the horizontal.

5. A materials handling machine comprising a single container of generally tubular form through which material is to be transported from a feed supply to a point of discharge, said container being of zig-zag configuration and being formed at one end thereof with a discharge opening, said container including a feed inlet dum portion at the other end of said machine, feed means disposed to provide a continuous feed of material into said drum, means for rotating said container about its longitudinal axis, and means for adjusting the inclination of said axis relative to the horizontal.

6. A materials handling machine comprising a container of generally tubular form but undulant shaped in side view and having its general longitudinal axis disposed substantially horizontally, said container being formed at one end thereof with a discharge opening, said container including a feed inlet drum at the other end of said machine, feed means disposed to feed material into said drum, means for rotating said container about its general longitudinal axis, and means for adjusting the flow rate through said container.

7. A materials handling machine comprising an undulant container disposed with its general longitudinal axis disposed substantially horizontally, means for rotating said container about said general longitudinal axis, said container including an intermediate portion comprised of a series of legs interconnected in end-to-end, zig-zag relation and defining an undulant flow path within said intermediate portion so that material is fed toward both ends of said container within said intermediate portion thereof as said container is rotated, means for introducing material into one end of said intermediate portion whereby the net flow of material is toward the opposite end of said intermediate portion, and means for receiving and discharging material from the opposite end of said intermediate portion.

8. A materials handling machine comprising a tubular container of undulant form having a longitudinal axis of rotation, said container terminating at one end in a discharge portion and at the other end in an inlet opening, said container including a substantially cylindrical feed inlet drum portion having its geometrical axis extending substantially in the same direction as the longitudinal axis of said container, said inlet opening leading into said drum eccentrically of the geometrical axis thereof, feed means disposed to feed material into said drum, and means for rotating said container about said longitudinal axis of rotation.

9. A materials handling machine as defined in claim 6 wherein said feed inlet drum is of substantially cylindrical shape having its geometrical axis extending substantially in the same direction as the longitudinal axis of said container, said feed inlet drum having an opening disposed eccentrically of is geometrical axis which leads into the undulant portion of the container.

10. A materials handling machine as defined in claim 7 wherein said means for introducing material into said one end of the intermediate portion comprises a substantially cylindrical feed inlet drum having its geometrical axis extending substantially in the same direction as the general longitudinal axis of the container, said feed inlet drum having an opening leading into said one end of the intermediate portion which is eccentric to the geometrical axis of the feed inlet drum.

References Cited

UNITED STATES PATENTS

| | | | |
|---|---|---|---|
| 977,897 | 12/1910 | Nims | 259—175 |
| 1,129,102 | 2/1915 | Judd | 259—3 |

WALTER A. SCHEEL, *Primary Examiner.*

J. M. BELL, *Assistant Examiner.*